US012791684B2

(12) United States Patent
Huang et al.

(10) Patent No.: US 12,791,684 B2
(45) Date of Patent: Nov. 10, 2026

(54) METHODS AND SYSTEMS FOR LIDAR AND LIDAR CONTROL

(71) Applicant: Hesai Technology Co., Ltd., Shanghai (CN)

(72) Inventors: Fuwei Huang, Shanghai (CN); Congbo Shi, Shanghai (CN); Liangchen Ye, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 637 days.

(21) Appl. No.: 18/209,171

(22) Filed: Jun. 13, 2023

(65) Prior Publication Data

US 2023/0375682 A1 Nov. 23, 2023

Related U.S. Application Data

(63) Continuation of application No. PCT/CN2021/104124, filed on Jul. 2, 2021.

(51) Int. Cl.

*G01C 3/08* (2006.01)
*G01S 7/484* (2006.01)
*G01S 7/4865* (2020.01)
*G01S 7/487* (2006.01)
*G01S 17/14* (2020.01)

(52) U.S. Cl.

CPC ............ *G01S 7/4873* (2013.01); *G01S 7/484* (2013.01); *G01S 7/4865* (2013.01); *G01S 17/14* (2020.01)

(58) Field of Classification Search

CPC ...... G01S 7/4873; G01S 7/484; G01S 7/4865; G01S 17/14

See application file for complete search history.

(56) References Cited

U.S. PATENT DOCUMENTS 11,513,192 B2 * 11/2022 Bang .................... G01S 7/4861
2013/0342383 A1 12/2013 Kojima
2020/0142039 A1 * 5/2020 Liu ...................... G01S 7/4865

FOREIGN PATENT DOCUMENTS

CN 105137443 A * 12/2015 ............ G01S 17/10
CN 106772404 A 5/2017
CN 107728156 A * 2/2018 .............. G01S 7/48
CN 109387844 A 2/2019
CN 109581328 A 4/2019
CN 109683171 A 4/2019
CN 110109130 A 8/2019

(Continued)

OTHER PUBLICATIONS

PCT/CN2021/104124 (English Translation) International Search Report and Written Opinion dated Sep. 28, 2021.

*Primary Examiner* — Mark Hellner

(74) *Attorney, Agent, or Firm* — Wilson Sonsini Goodrich & Rosati

(57) ABSTRACT

A method for controlling a lidar and a lidar are provided. The method includes: emitting a first sequence of laser pulses, the first sequence of laser pulses including at least a first detection pulse and a second detection pulse coded at a time interval T; receiving a plurality of echo pulses; determining whether an overlay is present among the plurality of echo pulses; and controlling the lidar to emit a second sequence of laser pulses to perform re-detection based on a determination of whether the overlay is present among the plurality of echo pulses.

36 Claims, 9 Drawing Sheets

100

(56) References Cited

FOREIGN PATENT DOCUMENTS

| | | | |
|---|---|---|---|
| CN | 110412594 | A | 11/2019 |
| CN | 110456376 | A | 11/2019 |
| CN | 110799802 | A | 2/2020 |
| CN | 114646942 | A | 6/2022 |
| JP | 2018043562 | A | 3/2018 |
| WO | WO-2019109993 | A1 | 6/2019 |
| WO | WO-2022134525 | A1 | 6/2022 |

* cited by examiner

10

10

METHODS AND SYSTEMS FOR LIDAR AND LIDAR CONTROL

CROSS-REFERENCE

This application is a Continuation application of International PCT Application No. PCT/CN2021/104124, filed on Jul. 2, 2021, which claims the benefit of Chinese Application No. CN202011518007.4, filed on Dec. 21, 2020, the content of each of which is incorporated herein by reference in its entirety.

TECHNICAL FIELD

The present disclosure relates to the field of laser detection, and in particular, to a method for controlling a lidar.

BACKGROUND

For a lidar using a coaxial transceiver system, a receiving device not only can receive an echo generated though the laser reflected by an object, but also can receive an echo of stray light generated though the laser directly reflected by an optical window to the receiving device. For a computing module in the lidar, an echo signal of the stray light belongs to an interference signal, and the presence of the echo signal of the stray light may lead to calculation of wrong ranging results.

A coded double-pulse detection beam is used during lidar ranging, and the two pulses are respectively a first pulse A and a second pulse B. If the echo pulse of a target object corresponding to the first pulse A is just overlaid with the echo signal of the stray light of the second pulse B, the lidar cannot identify the double echo pulse, which may cause the lidar to fail to measure distance accurately or to have a significantly reduced ranging accuracy.

As shown in FIG. 1, during normal ranging, the lidar uses the coded double-pulse detection beam, and the echo beam is the corresponding coded double echo pulse. When a waveform of an echo pulse (the first echo pulse and the second echo pulse in FIG. 1) does not overlap with the waveform of the echo signal of the stray light (the first echo pulse of the optical window and the second echo pulse of the optical window in FIG. 1), that is, as shown in FIG. 1, a time of the first echo pulse is at a position t1, a time of the second echo pulse of the optical window is at a position t, and t1≠t. In this case, a decoding module in the lidar can identify the echo pulses (that is, the first echo pulse and the second echo pulse) and complete the correct decoding of the echo pulses.

However, when the echo pulse overlaps with the echo pulse of the stray light, as shown in FIG. 2, since the first echo pulse is overlaid with the second echo pulse of the stray light (the second echo pulse of the optical window in the figure), that is, as shown in FIG. 1, the time of the first echo pulse is at the position t1, the time of the second echo pulse of the optical window is at the position t, and t1 approximately equal to t. This waveform cannot be matched with the second echo pulse in the decoding module, and therefore cannot be identified as an echo pulse. Finally, the presentation in the point cloud is as follows: a blind area of the lidar is formed near the region corresponding to a coding duration t, that is, target objects at a distance near (ct/2) cannot be detected and identified.

The content of "Background" is merely technologies known to the inventor, and does not represent the prior art in this field.

SUMMARY

In view of at least one defect of the prior art, the present disclosure provides a control method for a lidar. According to the control method, re-detection is performed on a blind area caused by an overlay between an echo pulse and an echo pulse of stray light produced by an optical window, thereby achieving a more accurate ranging result of the lidar and achieving full coverage of the field of view within a detection range of the lidar.

In an aspect of the present disclosure, a method for controlling a lidar is provided. The method comprises:

emitting a first sequence of laser pulses, the first sequence of laser pulses including at least a first detection pulse and a second detection pulse coded at a time interval T; receiving a plurality of echo pulses; determining whether an overlay is present among the plurality of echo pulses; and controlling the lidar to emit a second sequence of laser pulses to perform re-detection based on a determination of whether the overlay is present among the plurality of echo pulses.

In some embodiments, determining whether the overlay is present among the plurality of echo pulses comprises determining whether the overlay is present among the plurality of echo pulses based on an echo pulse of the plurality of echo pulses, where the echo pulse of the plurality of echo pulses is not overlaid with an echo pulse of an optical window.

In some cases, determining whether the overlay is present among the plurality of echo pulses comprises determining whether an echo pulse is present within a special time range, the special time range being: a time range from (2T−Δt) to (2T+Δt) after emission of the first detection pulse, Δt being determined according to a time interval between the first sequence of laser pulses and the echo pulse of the optical window corresponding to the first sequence of laser pulses.

In some embodiments, determining whether the overlay is present among the plurality of echo pulses comprises determining whether the echo pulse is greater than a first threshold when the echo pulse is present within the special time range, and controlling the lidar to emit the second sequence of laser pulses to perform the re-detection based on the determination of whether the overlay is present among the plurality of echo pulses comprises controlling the lidar to emit the second sequence of laser pulses to perform the re-detection when the echo pulse is greater than the first threshold.

In some embodiments, determining whether the overlay is present among the plurality of echo pulses comprises determining whether the overlay is present among the plurality of echo pulses based on the overlay between an echo pulse of an optical window and an echo pulse.

In some embodiments, determining whether the overlay is present among the plurality of echo pulses comprises determining whether an echo pulse is present within a special time range, the special time range being: a time range from (T−Δt) to (T+Δt) after emission of the first detection pulse, Δt being determined according to a time interval between the first sequence of laser pulses and the echo pulse of the optical window corresponding to the first sequence of laser pulses.

In some embodiments, determining whether the overlay is present among the plurality of echo pulses comprises determining whether the echo pulse within the special time range is greater than a second threshold if the echo pulse is present within the special time range, and controlling the lidar to emit the second sequence of laser pulses to perform the re-detection based on the determination of whether the overlay is present among the plurality of echo pulses comprises controlling the lidar to emit the second sequence of laser pulses to perform the re-detection when the echo pulse is greater than the second threshold.

In some embodiments, the second threshold is obtained according to an average of optical window echo intensities of the lidar through a plurality of measurements and a first threshold of the echo pulse.

In some embodiments, controlling the lidar to emit the second sequence of laser pulses to perform the re-detection based on the determination of whether the overlay is present among the plurality of echo pulses comprises controlling the lidar to emit the second sequence of laser pulses to perform re-detection when the overlay is present among the plurality of echo pulses, the second sequence of laser pulses including a third detection pulse.

In some embodiments, controlling the lidar to emit the second sequence of laser pulses to perform the re-detection based on the determination of whether the overlay is present among the plurality of echo pulses comprises controlling the lidar to emit the second sequence of laser pulses to perform re-detection when the overlay is present among the plurality of echo pulses, the second sequence of laser pulses including at least a fourth detection pulse and a fifth detection pulse coded at a time interval T', and the time interval T' being different from the time interval T.

In some embodiments, the method further comprises: setting a re-detection mark signal to adjust a priority of emitting the second sequence of laser pulses when the echo pulse is detected within the special time range.

In some embodiments, the method further comprises: immediately emitting the second sequence of laser pulses to perform the re-detection according to the re-detection mark signal in response to a laser device in a current detection channel completes emitting the first sequence of laser pulses.

In some embodiments, the method further comprises: emitting, by the laser device in the current detection channel, the second sequence of laser pulses to perform the re-detection according to the re-detection mark signal before a laser device in a next detection channel emits the first sequence of laser pulses.

In some embodiments, the method further comprises: sampling the echo pulse and acquiring a waveform of the echo pulse.

In some embodiments, the method further comprises: detecting whether the echo pulse is present within the special time range according to the sampled signal of the echo pulse.

In some embodiments, the method further comprises: detecting whether the echo pulse is present within the special time range according to the waveform of the echo pulse.

In some embodiments, the method further comprises: completing the re-detection between completion of current detection of the current detection channel in response to emitting the first sequence of laser pulses and start of detection of a next detection channel, and the control method further includes: resetting the re-detection mark signal for each detection channel before start of detection of a next detection channel.

In some embodiments, the method further comprises: acquiring a re-detection result. In some cases, the method further comprises: performing signal processing through single-pulse decoding or multi-pulse decoding depending on whether the second sequence of laser pulses is a sequence of single pulse or a sequence of multiple pulses, and outputting the re-detection result.

In some embodiments, the lidar is a coaxial lidar.

In another aspect of the present disclosure, a lidar is provided. The lidar comprises: an emitting unit, configured to emit a first sequence of laser pulses, the first sequence of laser pulses including at least a first detection pulse and a second detection pulse coded at a time interval T; a receiving unit, configured to receive a plurality of echo pulses; a re-detection and control unit, configured to determine whether an overlay is present among the plurality of echo pulses; and an emission control unit, configured to control the lidar to emit a second sequence of laser pulses to perform re-detection based on a determination of whether the overlay is present among the plurality of echo pulses.

In some embodiments, the re-detection and control unit is further configured to determine whether the overlay is present among the plurality of echo pulses based on an echo pulse of the plurality of echo pulses, where the echo pulse of the plurality of echo pulses is not overlaid with an echo pulse of an optical window.

In some embodiments, the re-detection and control unit is configured to determine whether the overlay is present among the plurality of echo pulses based on a determination of whether an echo pulse is present within a special time range, the special time range being: a time range from $(2T-\Delta t)$ to $(2T+\Delta t)$ after emission of the first detection pulse, $\Delta t$ being determined according to a time interval between the first sequence of laser pulses and the echo pulse of the optical window corresponding to the first sequence of laser pulses.

In some embodiments, the re-detection and control unit is configured to determine whether the echo pulse is greater than a first threshold when the echo pulse is present within the special time range, and the emission control unit is configured to control the lidar to emit the second sequence of laser pulses to perform re-detection when the echo pulse is greater than the first threshold.

In some embodiments, the re-detection and control unit is further configured to: determine whether the overlay is present among the plurality of echo pulses based on the overlay between an echo pulse of an optical window and an echo pulse.

In some embodiments, the re-detection and control unit is configured to determine whether the overlay is present among the plurality of echo pulses based on the determination of whether an echo pulse is present within a special time range, the special time range being: a time range from $(T-\Delta t)$ to $(T+\Delta t)$ after emission of the first detection pulse, $\Delta t$ being determined according to a time interval between the first sequence of laser pulses and the echo pulse of the optical window corresponding to the first sequence of laser pulses.

In some embodiments, the re-detection and control unit is configured to determine whether the echo pulse within the special time range is greater than a second threshold if the echo pulse is present within a special time range, and the emission control unit is configured to control the lidar to emit the second sequence of laser pulses to perform re-detection when the echo pulse is greater than the second threshold.

In some embodiments, the second threshold is obtained based on an average of optical window echo intensities of the lidar through a plurality of measurements and a first threshold of the echo pulse.

In some embodiments, the lidar further comprises a signal processing unit. The signal processing unit includes: an analog-to-digital converter (ADC) driving module, configured to sample the echo pulse and generate a sampled signal;

an ADC data processing module, configured to extract pulse information from the sampled signal to obtain basic pulse information; and a pulse processing module, configured to process the basic pulse information and output a ranging result.

In some embodiments, the emission control unit includes: an emission control module, configured to emit a control signal to the emitting unit to trigger the emitting unit to emit a laser detection pulse; and a timing control module, configured to generate a timing control signal and emit the timing control signal to the emission control module.

In some embodiments, the re-detection and control unit is further configured to receive the sampled signal generated by the ADC driving module, and determine whether the echo pulse is present within a special time range based on the sampled signal; and the re-detection and control unit is further configured to emit a re-detection signal to the emission control module, and the emission control module is further configured to trigger the emitting unit to emit the second sequence of laser pulses to perform re-detection based on the re-detection signal.

In some embodiments, the re-detection and control unit is further configured to receive the sampled signal generated by the ADC driving module, and determine whether the echo pulse is present within a special time range based on the sampled signal; and the re-detection and control unit is further configured to emit a re-detection signal to the timing control module, and the timing control module obtains an idle time period from a ranging window to perform re-detection based on the re-detection signal.

In some embodiments, the re-detection and control unit is further configured to receive the ranging result outputted by the pulse processing module, and determine whether the echo pulse is present within a special time range based on the ranging result; and the re-detection and control unit is further configured to emit a re-detection signal to the emission control module, and the emission control module is further configured to trigger the emitting unit to emit the second sequence of laser pulses to perform re-detection based on the re-detection signal.

In some embodiments, the re-detection and control unit is further configured to receive the ranging result outputted by the pulse processing module, and determine whether the echo pulse is present within a special time range according to the ranging result; and the re-detection and control unit is further configured to emit a re-detection signal to the timing control module, and the timing control module is further configured to obtain an idle time period from a ranging window to perform re-detection based on the re-detection signal.

In some embodiments, the emission control unit is further configured to: control the lidar to emit the second sequence of laser pulses to perform re-detection when the overlay is present among the plurality of echo pulses, the second sequence of laser pulses being a sequence of single pulse or a sequence of multiple pulses.

In some embodiments, the signal processing unit is configured to perform signal processing through single-pulse decoding or multi-pulse decoding depending on whether the second sequence of laser pulses is the sequence of single pulse or the sequence of multiple pulses, and output a re-detection result.

Some embodiment of the present disclosure provides a method for controlling a lidar. According to the method, re-detection is performed on a blind area caused by an overlay between an echo pulse and an echo signal of stray light produced by an optical window, thereby achieving a more accurate ranging result of the lidar and achieving full coverage of the field of view within a detection range of the lidar.

BRIEF DESCRIPTION OF THE DRAWINGS

The accompanying drawings are used to provide a further understanding of the present disclosure, and constitute a part of the specification, are used to explain the present disclosure in combination with the embodiments of the present disclosure, and do not constitute a limitation on the present disclosure. In the accompanying drawings.

DETAILED DESCRIPTION

Figure 1:
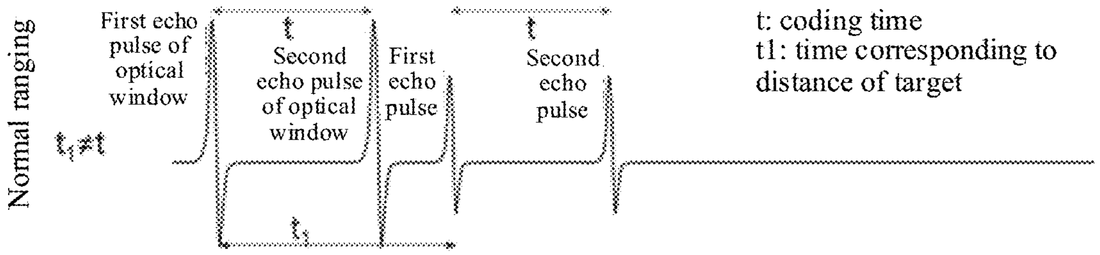
FIG. 1 schematically shows an example of a waveform without an overlay between an echo pulse and an echo pulse of an optical window.
Figure 2:
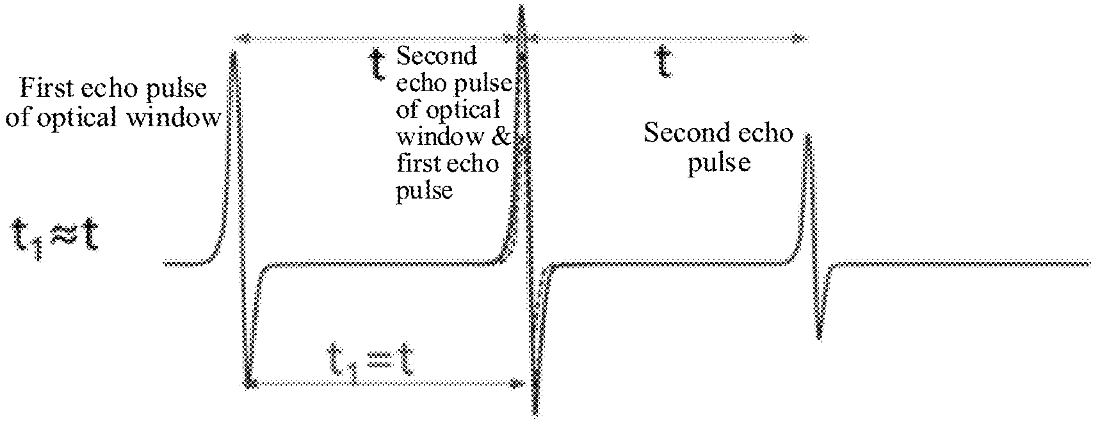
FIG. 2 schematically shows an example of a waveform with an overlay between an echo pulse and an echo pulse of the optical window.

Only some exemplary embodiments are briefly described below. As those skilled in the art can realize, the described embodiments may be modified in various different ways without departing from the spirit or the scope of the present disclosure. Therefore, the accompanying drawings and the description are to be considered illustrative in nature but not restrictive.

In the description of the present disclosure, it should be understood that directions or location relationships indicated by terms such as “center”, “longitudinal”, “transverse”, "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element should have a particular direction or should be constructed and operated in a particular direction, and therefore cannot be understood as a limitation on the present disclosure. In addition, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the descriptions of the present disclosure, unless otherwise explicitly specified, "multiple" means two or more than two.

In the description of the present disclosure, it should be noted that, unless otherwise specified or defined, terms such as "mount", "connected", and "connection" should be understood in a broad sense, for example, the connection may be a fixed connection, a detachable connection, or an integral connection; or the connection may be a mechanical connection, or may be an electrical connection or communication with each other; or the connection may be a direct connection, an indirect connection through an intermediate medium, internal communication between two components, or an interaction relationship between two components. A person of ordinary skill in the art may understand the specific meanings of the foregoing terms in the present disclosure according to specific situations.

In the present disclosure, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

Many different implementations or examples are provided in the following disclosure to implement different structures of the present disclosure. To simplify the disclosure of the present disclosure, components and settings in particular examples are described below. Certainly, they are merely examples and are not intended to limit the present disclosure. In addition, in the present disclosure, reference numerals and/or reference letters may be repeated in different examples. The repetition is for the purposes of simplification and clearness, and a relationship. Moreover, the present disclosure provides examples of various particular processes and materials, but a person of ordinary skill in the art may be aware of application of another process and/or use of another material.

Embodiments of the present disclosure are described below with reference to the accompanying drawings. It should be understood that the embodiments described herein are merely used for describing and explaining the present disclosure but are not intended to limit the present disclosure.

Figure 3:
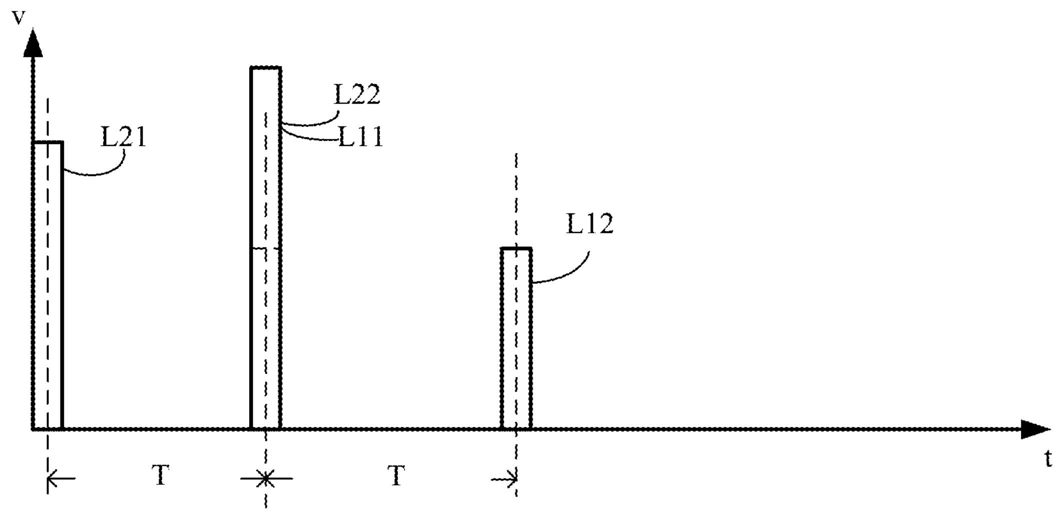
FIG. 3 schematically shows an example of a waveform received by a receiving device in a case that a second echo pulse of the optical window is overlaid with a first echo pulse.

In the case of using a coded double-pulse detection beam, a time interval between two detection pulses is T, and a time interval between two echo pulses formed after two detection pulses are respectively reflected by a target object and two echo pulses of an optical window formed after two detection pulses are respectively reflected by an optical window is also T. Since light propagates very fast, it may be considered that the echo pulse of the optical window immediately reaches the receiving device while the detection pulse is emitted. In a case that the second echo pulse of the optical window and the echo pulse generated though the first detection pulse reflected by the target object are overlaid, the receiving device may receive the waveform as shown in FIG. 3. As shown in FIG. 3, a time interval between a first echo pulse L21 of the optical window and a second echo pulse L22 of the optical window is T, and a time interval between a first echo pulse L11 generated though the first detection pulse reflected by the target object and a second echo pulse L12 generated though the second detection pulse reflected by the target object is also T. In addition, the second echo pulse L22 of the optical window and the first echo pulse L11 generated though the first detection pulse reflected by the target object are overlaid (at a time approximately equal to T after emission of the first detection pulse). Therefore, how to determine whether a blind area is present and how to re-detect the blind area in the case of determining that the blind area is present are the technical problems concerned in the present disclosure.

In order to solve the problem of a blind area caused by an overlay between an echo pulse and an echo pulse of stray light, the present disclosure provides a control method for a lidar, which is used for re-detecting the blind area caused by the overlay between the echo pulse and the echo pulse of the stray light produced by an optical window.

Figure 4:
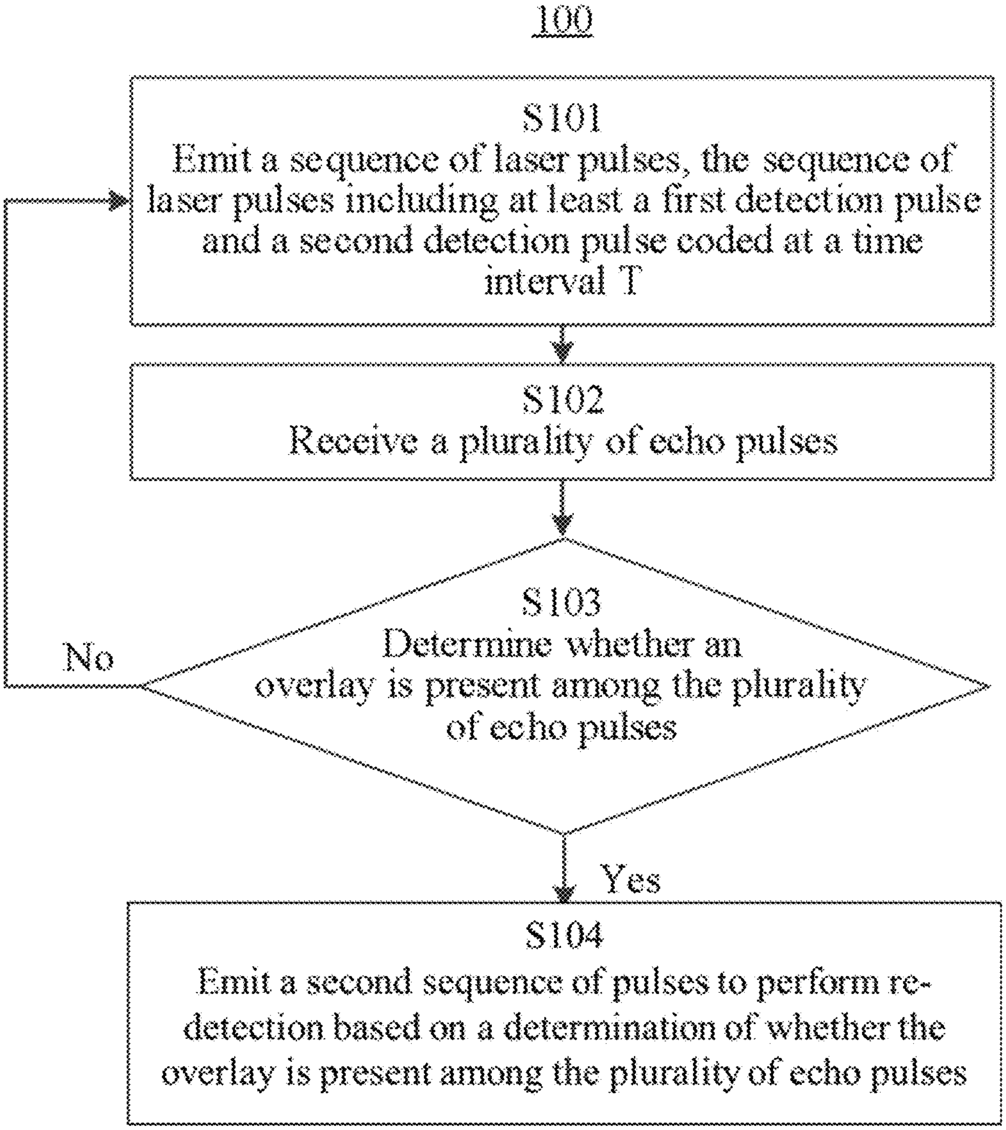
FIG. 4 shows an example of a method for controlling a lidar according to an embodiment of the present disclosure.

As shown in FIG. 4, accord to a preferred embodiment of the present disclosure, the present disclosure provides a control method 100 for a lidar, including the following steps.

In step S101, a first sequence of laser pulses is emitted, and the first sequence of laser pulses includes a first detection pulse and a second detection pulse coded at a time interval T. That is, a sequence of double pulses coded at the time interval T is emitted for detection.

In step S102, a plurality of echo pulses are received. For example, a sequence of echo pulses may be received by a photodetector and converted to an electrical signal. The echo pulses include a first echo pulse and a second echo pulse corresponding to the first detection pulse and the second detection pulse. If a target object is present in a detection range, a double echo pulse at the same time interval of T is to be received.

In step S103, it is determined whether an overlay is present among the plurality of echo pulses. In the present disclosure, whether the overlay between echo pulses has occurred may be determined in various manners, which is to be described in detail below. For example, based on the determination of whether an echo pulse is present within a special time range may be performed, that is, based on the determination of whether an overlay between the echo pulse generated though the detection pulse reflected by the target object and the echo pulse of the optical window is present. If the echo pulse is detected within the special time range, step S104 is performed. If the echo pulse is not detected within the special time range, upon completion of detection of a current detection channel, step S101 is performed again to drive a next detection channel to emit a sequence of laser pulses.

In step S104, the lidar is controlled to emit a second sequence of laser pulses to perform re-detection based on a determination of whether the overlay is present among the plurality of echo pulses. For example, when it is determined that at least two echo pulses in the plurality of echo pulses are overlaid (completely or partially overlaid in time), the lidar is controlled to emit the second sequence of laser pulses to perform re-detection.

According to a preferred embodiment of the present disclosure, in step S103, it is determined whether the overlay is present among the plurality of echo pulses according to an echo pulse of the plurality of echo pulses that is not overlaid with an echo pulse of an optical window, as described below with reference to FIG. 5*a* to FIG. 5*c*. Determining whether the overlay is present among the plurality of echo pulses comprises determining whether an echo pulse of the plurality of echo pulses is not overlaid with an echo pulse of an optical window. According to a preferred embodiment of the present disclosure, it is determined whether the overlay is present among the plurality of echo pulses comprises determining whether an echo pulse is present within a special time range. A preset delay time is $\Delta t$, and the special time range is: a time range from $(2T-\Delta t)$ to $(2T+\Delta t)$ after emission of the first detection pulse. Step S103 or determining whether the overlay is present among the plurality of echo pulses further comprises: determining whether the echo pulse is greater than a first threshold when the echo pulse is present within the special time range, and controlling the lidar to emit the second sequence of laser pulses to perform the re-detection based on the determination of whether the overlay is present among the plurality of echo pulses comprises controlling the lidar to emit the second sequence of laser pulses to perform the re-detection when the echo pulse is greater than the first threshold.

If the echo pulse is present at a time 2T after emission of the first detection pulse, the echo pulse may be the second detection pulse reflected by the target object. If the echo pulse is the second echo pulse, an overlay between the first echo pulse and the second echo pulse of the optical window is present at about the time T after emission of the first detection pulse. At is the interval time from the emitted detection pulse to the echo pulse reflected by the optical window being received by the receiving device, or a link processing time (about 80 ns), which may be preset according to actual measured results, such as acquiring the larger one or acquiring a sum of the two, which are within the protection scope of the present disclosure.

Figure 5A:
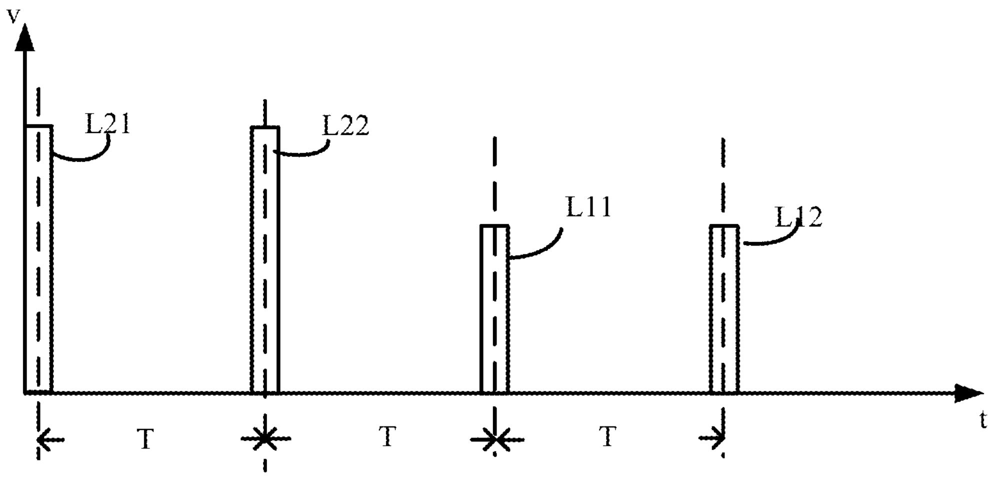
FIG. 5*a* schematically shows an exemplary situation where a pulse is detected within a time range of 2T±Δt.
Figure 5B:
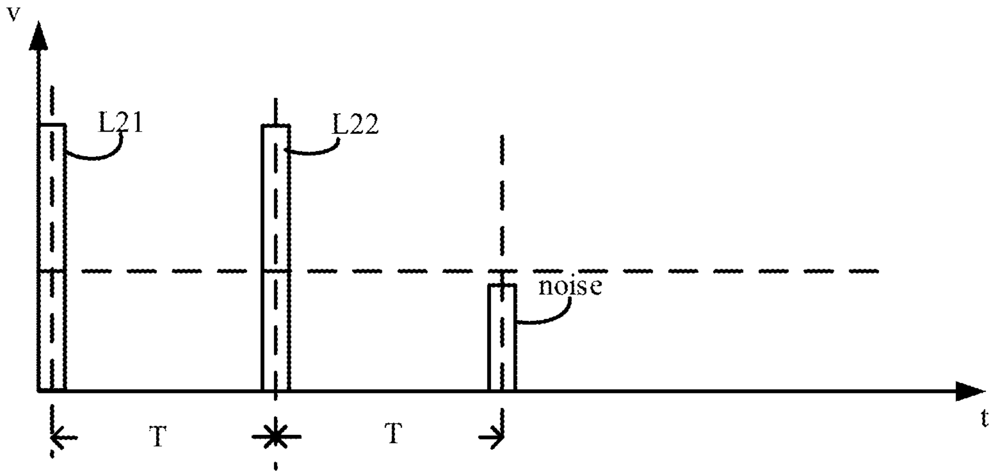
FIG. 5*b* schematically shows an exemplary situation where a pulse is detected within a time range of 2T±Δt.
Figure 5C:
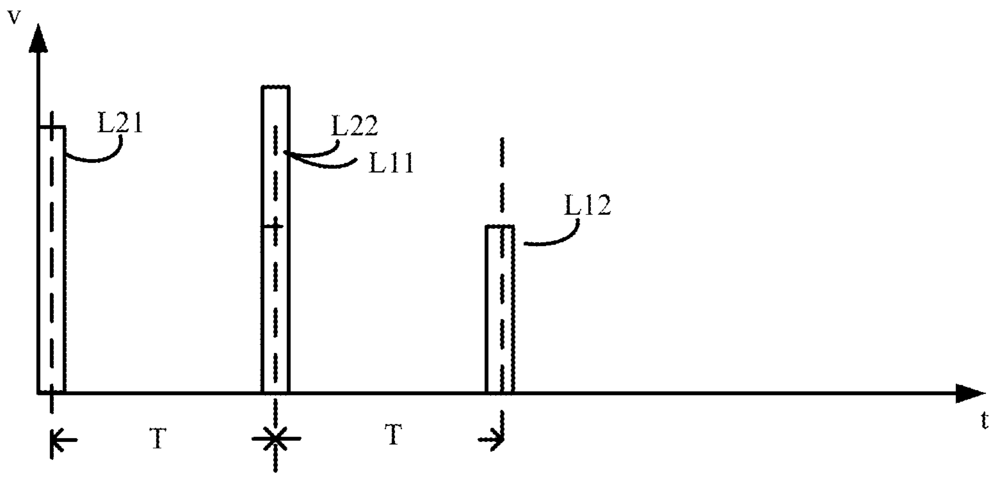
FIG. 5*c* schematically shows an exemplary situation where a pulse is detected within a time range of 2T±Δt.

As shown in FIG. 5*a*, FIG. 5*b*, and FIG. 5*c*, when a pulse is detected within a time range of $2T\pm\Delta t$, three cases are present. As shown in FIG. 5*a*, if the detected pulse is the first echo pulse L11 generated though the first detection pulse reflected by the target object, the second echo pulse L12 generated though the second detection pulse reflected by the target object is at the time T after the first echo pulse L11. In this case, no overlay between the echo pulse and the echo pulse of the optical window is present, the lidar can calculate the distance of the target object in a normal decoding manner, and a solving failure will not occur. As shown in FIG. 5*b*, if the detected pulse is a noise signal, filtering and identification may be performed according to the preset first threshold. As shown in FIG. 5*c*, if the detected pulse is the second echo pulse L12 generated though the second detection pulse reflected by the target object, the first echo pulse L11 generated though the first detection pulse reflected by the target object is at the time T after the second echo pulse L12. In this case, an overlay between the first echo pulse L11 and the second echo pulse L22 of the optical window is present, which may affect the decoding. When a detection as to whether a pulse is present within the time range of $2T\pm\Delta t$ may be performed, it is only necessary to determine whether the pulse within the time range is an echo pulse without needing to filter out the echo pulse of the optical window, and therefore the determination method is simple. For the overlay in FIG. 5*c*, it is determined whether the overlay is present among the plurality of echo pulses by using the second echo pulse L12 of the plurality of echo pulses that is not overlaid with the echo pulse of the optical window. When the second echo pulse L12 greater than a first (noise) threshold (as shown by a dashed line in FIG. 5*b*) is present within the time range of $2T\pm\Delta t$, it may be determined that the overlay between echo pulses is present.

According to another embodiment of the present disclosure, in step S103, determining whether the overlay is present among the plurality of echo pulses comprises determining whether the overlay is present among the plurality of echo pulses based on the overlay between the echo pulse of the optical window and the echo pulse, as described below with reference to FIG. 6*a* to FIG. 6*c*. According to a preferred embodiment of the present disclosure, it is determined whether the overlay is present among the plurality of echo pulses by detecting whether an echo pulse is present within a special time range. A preset delay time is $\Delta t$, and the special time range is: a time range from $(T-\Delta t)$ to $(T+\Delta t)$ after emission of the first detection pulse. Step S103 further includes: determining whether the echo pulse within the special time range is greater than a second threshold if the echo pulse is present within the special time range, and performing step S104 when the echo pulse is greater than the second threshold.

If the echo pulse is present at the time T after emission of the first detection pulse, the echo pulse may be an echo pulse generated though the first detection pulse reflected by the target object. If the echo pulse is the first echo pulse, an overlay between the echo pulse and the echo pulse of the optical window is present at about the time T after emission of the first detection pulse. At is the time from the detection pulse to the echo pulse generated though the detection pulse reflected by the optical window being received by the receiving device, or a link processing time, which may be preset according to actual measured results, such as acquiring the larger one or acquiring a sum of the two, which are within the protection scope of the present disclosure.

Figure 6A:
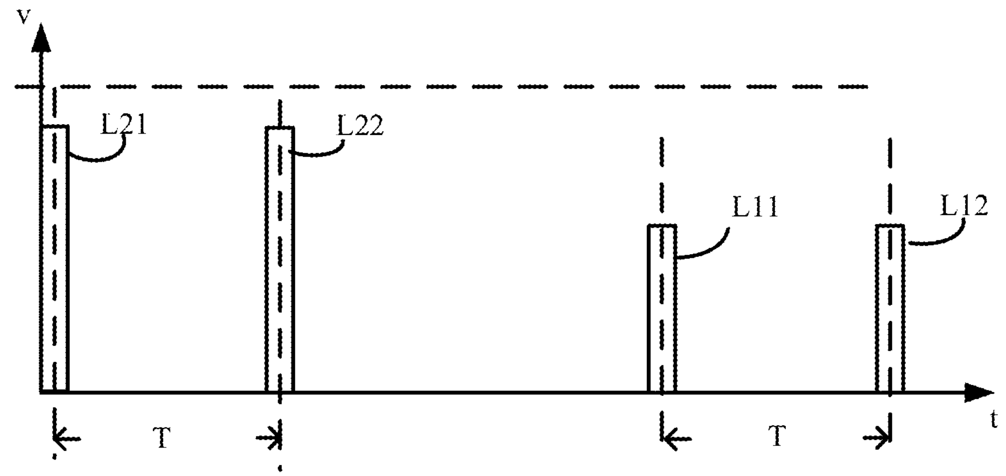
FIG. 6*a* schematically shows an exemplary situation where a pulse is detected within a time range of T±Δt.
Figure 6B:
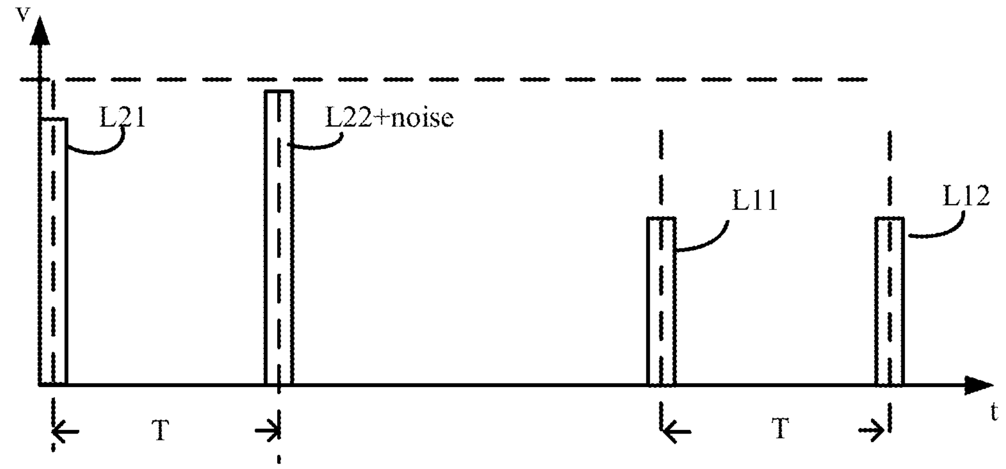
FIG. 6*b* schematically shows an exemplary situation where a pulse is detected within a time range of T±Δt.
Figure 6C:
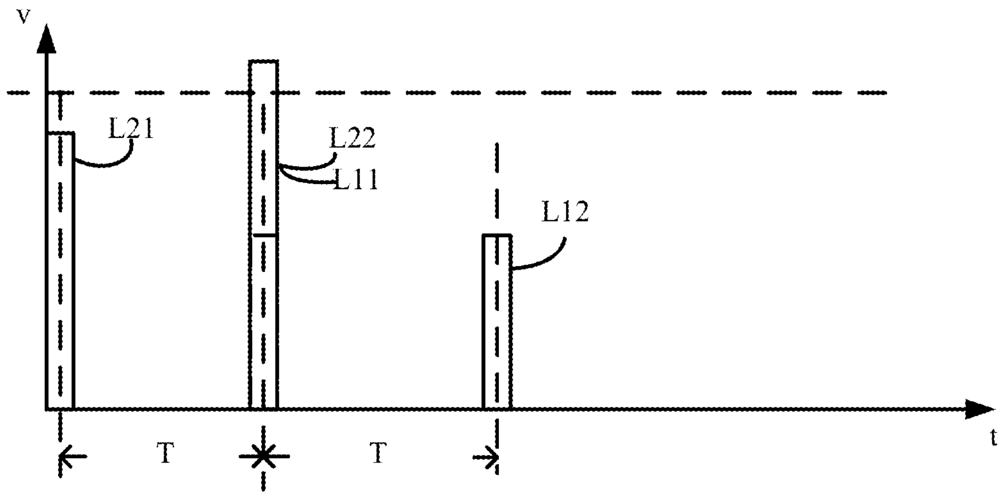
FIG. 6*c* schematically shows an exemplary situation where a pulse is detected within a time range of T±Δt.

As shown in FIG. 6*a*, FIG. 6*b*, and FIG. 6*c*, when a pulse is detected within a time range of $T\pm\Delta t$, three cases are present. As shown in FIG. 6*a*, the detected pulse is the second echo pulse L22 of the optical window of the second detection pulse. As shown in FIG. 6*b*, the detected pulse is an overlay between the second echo pulse of the optical window and a noise signal. In the cases shown in FIG. 6*a* and FIG. 6*b*, the lidar can calculate the distance of the target object in a normal decoding manner, and a solving failure will not occur. As shown in FIG. 6*c*, the first echo pulse L11 generated though the first detection pulse reflected by the target object is overlaid on the second echo pulse L22 of the optical window, which may be identified according to the preset second threshold. This case may affect the decoding. For the overlay of FIG. 6*c*, it is determined whether the overlay is present among the plurality of echo pulses through the overlay between an echo pulse of an optical window and an echo pulse. As shown in FIG. 6*c*, when the echo pulse L11/L22 greater than a second threshold (as shown by the dashed line in FIG. 6*a* to FIG. 6*c*) is present within the time range of T±Δt, it may be determined that the overlay between the echo pulse is present.

According to some embodiment of the present disclosure, the second threshold may be set based on the overlay between an average of optical window echo intensities through a plurality of measurements and the threshold for identifying the echo pulse (that is, the first threshold). The second echo pulse L22 of the optical window may be filtered by setting a threshold based on the average of optical window echo intensities through the plurality of measurements, and the noise may also be filtered by setting the first threshold, so that the two values are overlaid to filter out the second echo pulse L22 of the optical window and the noise within the time range of T±Δt. If a pulse is still present, the pulse is the echo pulse L11 generated though the first detection pulse reflected by the target object. According to the method, it is determined, by setting the threshold related to the echo pulse of the optical window, whether the pulse within the time range is an echo pulse, and the determination result is highly accurate.

According to some embodiment of the present disclosure, step S103 further comprises: setting a re-detection mark signal to adjust a priority of emitting the second sequence of laser pulses when the echo pulse is detected within the special time range.

Preferably, each detection channel of a multi-channel lidar may emit light in turn, and the time interval between light emitting of the current detection channel and light emitting of the next detection channel may be defined as a ranging window. The ranging window may be set according to the maximum distance to detect the target object, so that a time of flight corresponding to the target object can be obtained according to the ranging window, and the emitting of the second sequence of laser pulses to perform re-detection should be completed in the ranging window. The first method is immediately emitting the second sequence of laser pulses to perform the re-detection according to the re-detection mark signal in response to a laser device in a current detection channel completes emitting the sequence of laser pulses. The advantage of the re-detection method is that the re-detection can be completed in time, and the situation of the overlay caused by a fact that it is too late to emit the second sequence of laser pulses and the next detection channel has already started to emit the sequence of laser pulses may not occur. The second method is emitting, by the laser device in the current detection channel, the second sequence of laser pulses to perform the re-detection according to the re-detection mark signal before the current ranging window is closed, that is, before a laser device in a next detection channel may emit the sequence of laser pulses. The advantage of the re-detection method is that the echo pulse reflected by the target object in the distance and the echo pulse of re-detection are not confused, and the time interval between sequential emitting of adjacent detection channels is fully utilized. Preferably, the second sequence of laser pulses includes a third detection pulse, that is, the emitting device may emit a single-pulse beam as the third detection pulse. Alternatively, the second sequence of laser pulses may also include at least a fourth detection pulse and a fifth detection pulse coded at a time interval T', and the time interval T' is different from the time interval T. The advantage of continuously emitting the sequence of double pulses is that it not only can resist interference, but also can ensure that the echo pulse can be received, which all fall within the protection scope of the present disclosure. According to a preferred embodiment of the present disclosure, the control method 100 further includes: sampling the echo pulse and acquiring a waveform of an echo pulse. Preferably, an analog-to-digital converter (ADC) is used to collect the echo pulse and obtain a real-time waveform of the echo pulse. The echo pulse is collected through the ADC to obtain sampling points, and the sampling points are inputted into the pulse processing module for processing, so as to output a complete waveform. Whether an echo pulse is present within a special time range may be detected through two methods. One method is directly detecting the sampling points collected by the ADC, that is, detecting whether an echo pulse is present within the special time range according to the sampled signal. Through this method, there is no need to wait for the output result of the pulse processing module, the detection time is short, and the re-detection can be performed in time without reducing the point cloud density of the lidar. The second method is performing detection through the complete waveform outputted by the pulse processing module. The detection objects in this method include a pulse leading time, a pulse width, and a peak value to obtain a distance and reflectivity of the target object, and the detection results are relatively accurate.

According to some embodiment of the present disclosure, step S104 further comprises: completing the re-detection between completion of detection of the current detection channel in response to emitting the first sequence of laser pulse and start of detection of a next detection channel, and the control method 100 further includes: resetting the re-detection mark signal for each detection channel before start of detection of a next detection channel. By changing the value of the re-detection mark signal, the controller may control the lidar to emit the second sequence of laser pulses to perform re-detection, and the signal processing unit may also determine, by using the value of the re-detection mark signal, which algorithm is used for calculating the distance of the target object. That is to say, when it is detected that the value of the re-detection mark signal is changed, the distance of the target object is obtained through single-pulse decoding or multi-pulse decoding, which need to be completed in the same ranging window. Therefore, the re-detection mark signal should be reset before the detection of the next detection channel starts.

According to an embodiment of the present disclosure, the method 100 further includes step S105: acquiring a re-detection result. In step S105, signal processing may be performed through single-pulse decoding or multi-pulse decoding depending on whether the second sequence of laser pulses is a sequence of single pulse or a sequence of multiple pulses, and the re-detection result is outputted.

Figure 7A:
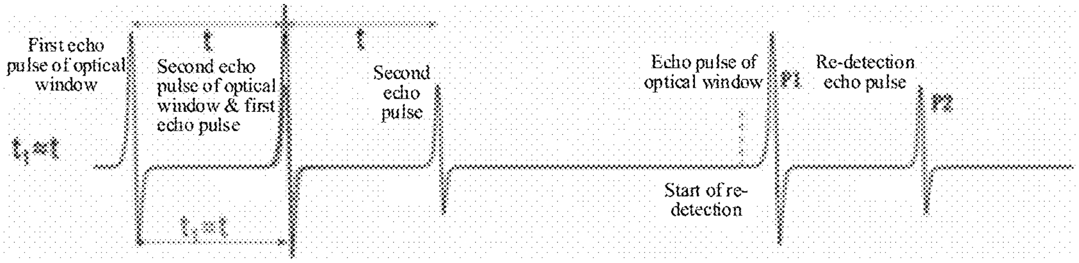
FIG. 7A schematically shows an example of a waveform received by a receiving device when a single pulse is used to perform re-detection.

FIG. 7A shows a waveform received by a receiving device when a single pulse is used to perform re-detection. As shown in FIG. 7A, at the time t, a first echo pulse from a target object and a second echo pulse from an optical window are overlaid. In this case, for the same target object (that is, the distance between the target object and the lidar is approximately constant), the lidar is controlled to emit a third detection pulse (a single pulse) to perform re-detection. After emission of the third detection pulse, the receiving device may receive an echo pulse P1 from the optical window and a re-echo pulse P2 from the target object respectively, then performs signal processing, and outputs a re-detection result.

Figure 7B:
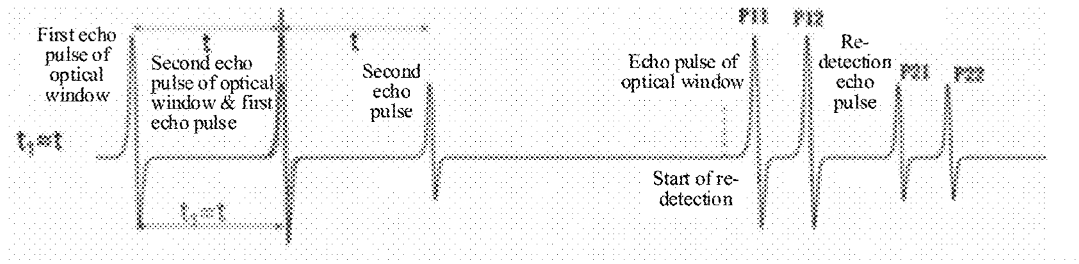
FIG. 7B schematically shows an example of a waveform received by a receiving device when double pulses are used to perform re-detection.

FIG. 7B schematically shows a waveform received by a receiving device when double pulses are used to perform re-detection. As shown in FIG. 7B, at the time t, a first echo pulse from a target object and a second echo pulse from an optical window are overlaid. In this case, for the same target object (that is, the distance between the target object and the lidar is approximately constant), the lidar is controlled to emit a fourth detection pulse and a fifth detection pulse (double pulses) to perform re-detection. After emission of the fourth detection pulse and the fifth detection pulse, the receiving device may respectively receive the echo pulses P11 and P12 from the optical window and the re-detection echo pulses P21 and P22 from the target object, then performs signal processing, and outputs the re-detection result. Since the target objects at the same distance are re-detected, the time interval between the echo pulse P11 of the optical window and the re-detection echo pulse P21 is still t, and the double pulses coded at the time interval t' (different from the time interval t) is used during the re-detection, then the time interval between the re-detection echo pulses P21 and P22 and the time interval between the echo pulses P11 and P12 of the optical window are both t'. In FIG. 7B, t'<t, and therefore the re-detection echo pulse P21 and the echo pulse P12 of the optical window are not overlaid.

According to some embodiment of the present disclosure, the control method 100 further comprises: performing, by the controller of the lidar, signal processing through single-pulse or multi-pulse decoding according to the re-detection mark signal, and outputting a re-detection result. That is to say, it is determined according to the re-detection mark signal whether the re-detection is performed and which mode is used for re-detection. If the re-detection is performed in the mode of emitting a single pulse, the processing algorithm of the signal processing unit is changed, and a ranging result is calculated by using the corresponding algorithm of single-pulse decoding. The re-detection is performed by emitting a single pulse, and the distance of the target object is calculated by using the algorithm corresponding to the single pulse. Compared with the multi-pulse ranging process and calculation process, the time is shorter, and the point cloud density of the lidar is also ensured accordingly.

The control method 100 provided in the present disclosure is applicable to a coaxial lidar, that is, an overlay between the echo pulse and the echo pulse of the optical window may be present. For the double-pulse or multi-pulse coded lidar, since an emitting optical path and a receiving optical path in a coaxial lidar are partially the same, part of the emitting light is reflected by the optical window (the optical window usually reflects 5%-10% of the emitting light) and then returns along the original path to be received by the receiving device. However, an emitting optical path and a receiving optical path in a paraxial optical path are separated, and a light isolation device is usually arranged. Therefore, the echo pulse of the optical window may not cause interference in the paraxial lidar.

The re-detection method provided in the present disclosure is also applicable to the case of multi-pulse coding, and a plurality of echo pulses of the optical window overlap with the echo pulses, so that whether a blind area is present may be determined separately or comprehensively, and re-detection is performed according to the determination result. For example, for the case of three-pulse detection, two blind areas may be present, that is, a case of an overlay between the second echo pulse of the optical window and the echo pulse generated though the first detection pulse reflected by the target object and an overlay between the third echo pulse of the optical window and the echo pulse generated though the second detection pulse reflected by the target object. In a case that it is determined through the threshold that the echo pulse is present within the corresponding time range, the re-detection is performed on the blind areas. These are all within the protection scope of the present disclosure.

Figure 8:
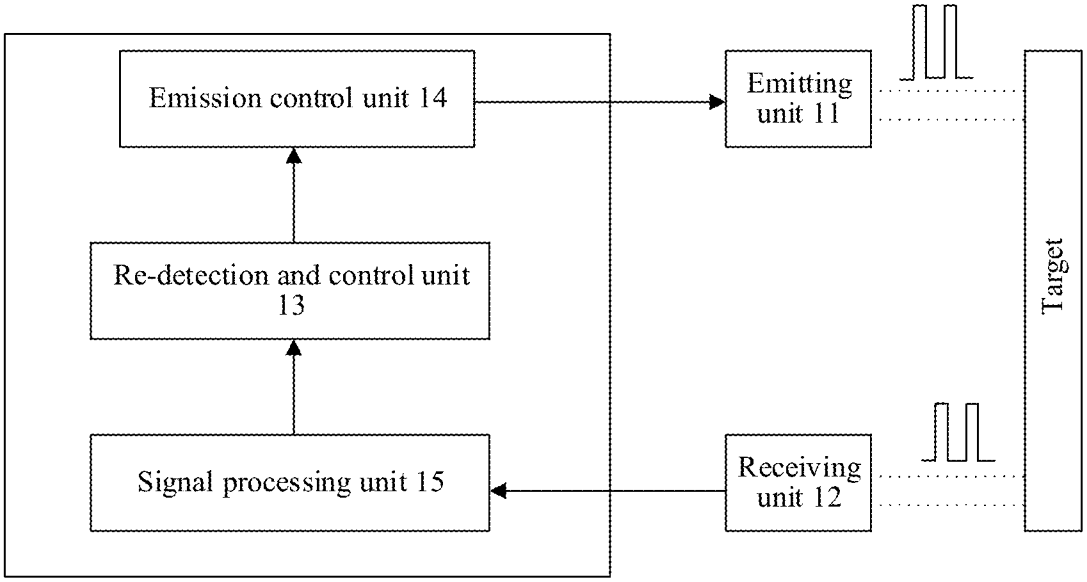
FIG. 8 schematically shows an example of a lidar according to some embodiment of the present disclosure.

According to a preferred embodiment of the present disclosure, as shown in FIG. 8, the present disclosure further provides a lidar 10, including: an emitting unit 11, a receiving unit 12, a re-detection and control unit 13, and an emission control unit 14. The emitting unit 11 may emit a first sequence of laser pulses. The first sequence of laser pulses includes at least a first detection pulse and a second detection pulse coded at a time interval T. The receiving unit 12 may receive a plurality of echo pulses and convert the echo pulses to an electrical signal. The receiving unit 12 may be an avalanche diode (APD), a silicon photon multiplier (SiPM), or a single photon avalanche diode array. The echo pulses include a first echo pulse and a second echo pulse corresponding to the first detection pulse and the second detection pulse. The re-detection and control unit 13 may determine whether an overlay among the plurality of echo pulses is present. For example, it is determined whether an overlay is present by detecting whether an echo pulse is present within a special time range. The emission control unit 14 may control the lidar to emit the second sequence of laser pulses again to perform re-detection when the re-detection and control unit 13 may determine that the overlay is present among the plurality of echo pulses. Preferably, the lidar 10 further includes a signal processing unit 15 configured to: sample a sequence of echo pulses received by the receiving unit 12 and generate a sampled signal, and process the sequence of echo pulses and output a ranging result. The signal processing unit 15 may include, for example, various types of hardware such as an analog-to-digital converter ADC, a time-to-digital converter TDC, a digital signal processor DSP, a single chip microcomputer, and a microprocessor MCU, and/or software program codes stored in a memory, and may convert an analog signal or a digital signal generated by the receiving unit 12 to an electrical signal for signal acquisition and processing.

According to an embodiment of the present disclosure, the re-detection and control unit 13 is further configured to determine whether the overlay is present among the plurality of echo pulses according to an echo pulse of the plurality of echo pulses that is not overlaid with an echo pulse of an optical window. According to a preferred embodiment of the present disclosure, the re-detection and control unit 13 may determine whether the overlay is present among the plurality of echo pulses by detecting whether an echo pulse is present within a special time range. A preset delay time is Δt, and the special time range is: a time range from (2T−Δt) to (2T+Δt) after emission of the first detection pulse. The re-detection and control unit 13 may determine whether the echo pulse is greater than a first threshold if the echo pulse is present within the special time range. The emission control unit 14 may control the lidar to emit the second sequence of laser pulses to perform re-detection when the echo pulse is greater than the first threshold.

If the echo pulse is present at a time 2T after emission of the first detection pulse, the echo pulse may be an echo pulse generated though the second detection pulse reflected by the target object. If the echo pulse is the second echo pulse, an overlay between the first echo pulse and the second echo pulse of the optical window is present at about the time T after emission of the first detection pulse. Δt is the interval time from the detection pulse to the echo pulse generated though the detection pulse reflected by the optical window being received by the receiving device, or a link processing time (about 80 ns), which may be preset according to actual measured results, such as taking the larger one or taking a sum of the two, which are within the protection scope of the present disclosure.

When a pulse is detected within a time range of 2T±Δt, as shown in FIG. 5a, FIG. 5b, and FIG. 5c, three cases are present. If the detected pulse is the first echo pulse L11 generated though the first detection pulse reflected by the target object, the second echo pulse L12 generated though the second detection pulse reflected by the target object is at the time T after the first echo pulse L11. In this case, no overlay between the echo pulse and the echo pulse of the optical window is present, the lidar can calculate the distance of the target object in a normal decoding manner, and a solving failure will not occur. The detected pulse is a noise signal and needs to be filtered by using a threshold. If the detected pulse is the second echo pulse L12 generated though the second detection pulse reflected by the target object, the first echo pulse L11 generated though the first detection pulse reflected by the target object is at the time T after the second echo pulse L12. In this case, an overlay between the first echo pulse L11 and the second echo pulse L22 of the optical window is present, which may affect the decoding. For the overlay in FIG. 5c, it is determined whether the overlay is present among the plurality of echo pulses by using the echo pulse L12 of the plurality of echo pulses that is not overlaid with the echo pulse of the optical window. When the echo pulse L12 greater than a first (noise) threshold (as shown by a dashed line in FIG. 5b) is present within the time range of 2T±Δt, it may be determined that the overlay between echo pulses is present.

According to another embodiment of the present disclosure, the re-detection and control unit 13 is further configured to determine whether the overlay is present among the plurality of echo pulses according to the overlay between the echo pulse of the optical window and the echo pulse, as described below with reference to FIG. 6a to FIG. 6c. According to still another preferred embodiment of the present disclosure, it is determined whether the overlay is present among the plurality of echo pulses by detecting whether an echo pulse is present within a special time range. A preset delay time is Δt, and the special time range is: a time range from (T−Δt) to (T+Δt) after emission of the first detection pulse. The re-detection and control unit 13 may determine whether the echo pulse within the special time range is greater than a second threshold when the echo pulse is present within the special time range. The emission control unit 14 may control the lidar to emit the second sequence of laser pulses to perform re-detection when the echo pulse is greater than the second threshold.

If the echo pulse is present at the time T after emission of the first detection pulse, the echo pulse may be an echo pulse generated though the first detection pulse reflected by the target object. If the echo pulse is the first echo pulse, an overlay between the echo pulse and the echo pulse of the optical window is present at about the time T after emission of the first detection pulse. Δt is the time from the detection pulse to the echo pulse generated though the detection pulse reflected by the optical window being received by the receiving device, or a link processing time, which may be preset according to actual measured results, such as taking the larger one or taking a sum of the two, which are within the protection scope of the present disclosure.

When the pulse is detected within the time range of T±Δt, three cases are present. The detected pulse is the second echo pulse L22 of the optical window from the second detection pulse, or the detected pulse is an overlay between the second echo pulse of the optical window and a noise signal. In the above cases, the lidar can calculate the distance of the target object in a normal decoding manner, and a solving failure will not occur. When the first echo pulse L11 generated though the first detection pulse reflected by the target object is overlaid on the second echo pulse L22 of the optical window, the decoding of the lidar may be affected.

According to some embodiment of the present disclosure, the second threshold may be set based on the overlay between an average of optical window echo intensities through a plurality of measurements and the threshold for identifying the echo pulse (that is, the first threshold). The second echo pulse L22 of the optical window may be filtered by setting a threshold based on the average of optical window echo intensities through the plurality of measurements, and the noise may also be filtered by setting the first threshold, so that the two values are overlaid to filter out the second echo pulse L22 of the optical window and the noise within the time range of T±Δt. If a pulse is still present, the pulse is the echo pulse L11 generated though the first detection pulse reflected by the target object.

Figure 9:
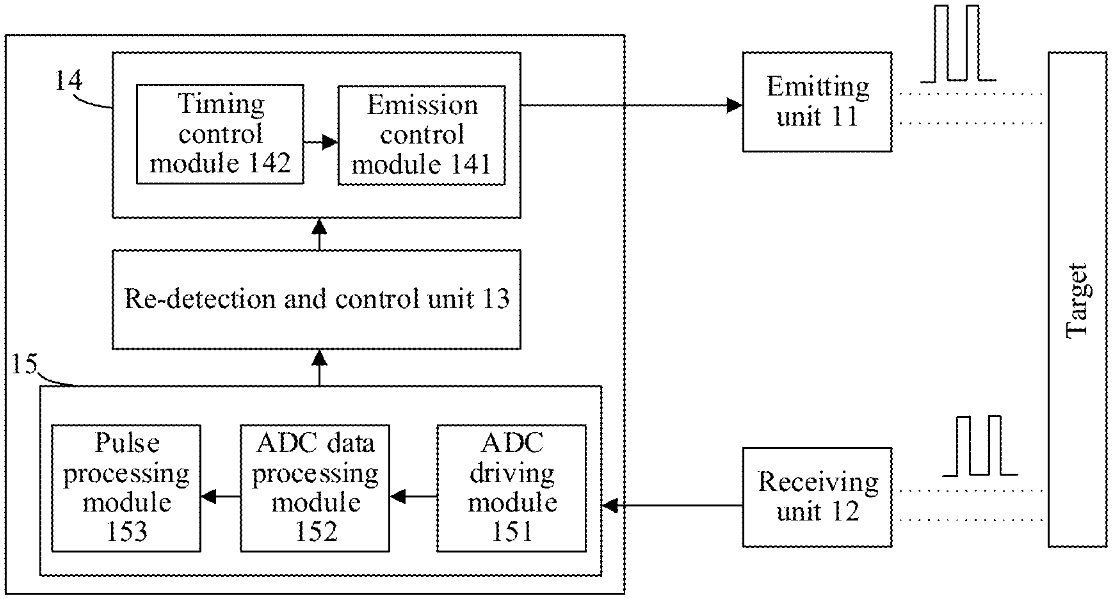
FIG. 9 schematically shows an example of a lidar according to some embodiment of the present disclosure.

According to some embodiment of the present disclosure, as shown in FIG. 9, the lidar 10 includes a signal processing unit 15. The signal processing unit 15 further comprises: an ADC driving module 151, configured to sample the sequence of echo pulses and generate a sampled signal; an ADC data processing module 152, configured to extract pulse information from the sampled signal to obtain basic pulse information; and a pulse processing module 153, configured to process the basic pulse information and output a ranging result. The ranging result includes a pulse leading time, a pulse width, and a peak value to obtain a distance and reflectivity of the target object, and the detection results are relatively accurate.

According to some embodiment of the present disclosure, as shown in FIG. 9, the emission control unit 14 of the lidar 10 further comprises: an emission control module 141, configured to emit a control signal to the emitting unit to trigger the emitting unit to emit a laser detection pulse; and a timing control module 142, configured to generate a timing control signal and emit the timing control signal to the emission control module.

Figure 10:
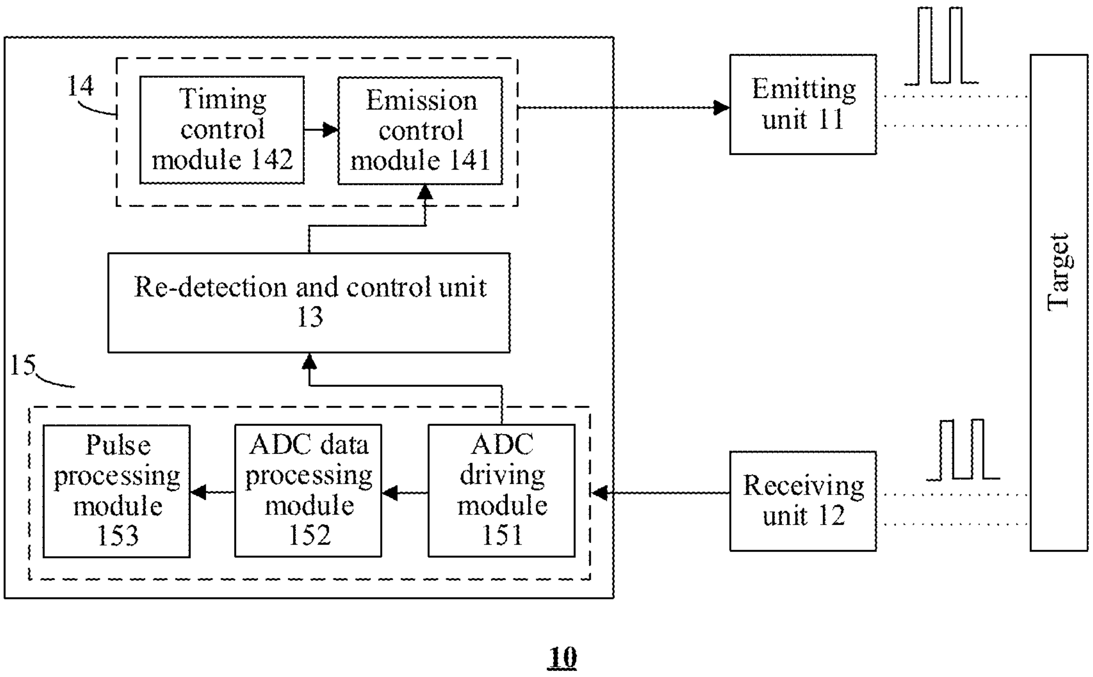
FIG. 10 schematically shows an example of a lidar according to some embodiment of the present disclosure.

According to some embodiment of the present disclosure, as shown in FIG. 10, in the lidar 10: the re-detection and control unit 13 may receive the sampled signal generated by the ADC driving module 151, and detects whether the echo pulse is present within a special time range according to the sampled signal; and the re-detection and control unit 13 may emit a re-detection mark signal to the emission control module 141, and the emission control module 141 triggers the emitting unit 11 to emit the third detection pulse to perform re-detection according to the re-detection mark signal.

That is, the re-detection and control unit 13 may determine whether the echo pulse is present within a special time range according to the sampled signal sampled by the ADC driving module 151. If the echo pulse is detected within the special time range, a re-detection mark signal is emitted to the emission control module 141. The emission control module 141 may immediately emit the third detection pulse to perform the re-detection according to the re-detection mark signal after the laser device of the current detection channel completes emitting the sequence of laser pulses.

The lidar 10 provided in this embodiment has the shortest detection and control path and the fastest speed, and can complete the re-detection operation in this ranging window to ensure that the point cloud density does not decrease, but it is necessary to additionally set a priority control signal.

Figure 11:
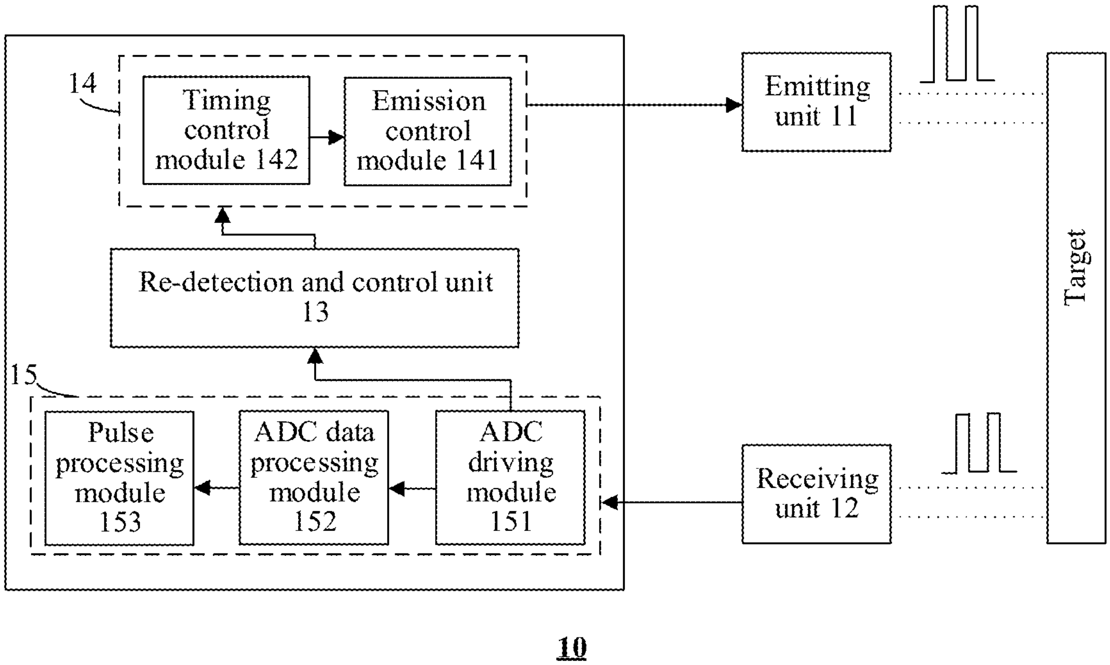
FIG. 11 schematically shows an example of a lidar according to some embodiment of the present disclosure.

According to some embodiment of the present disclosure, as shown in FIG. 11, in the lidar 10: the re-detection and control unit 13 may receive the sampled signal generated by the ADC driving module 151, and detects whether the echo pulse is present within a special time range according to the sampled signal; and the re-detection and control unit 13 may emit a re-detection mark signal to the timing control module 142, and the timing control module 142 obtains an idle time period from a ranging window according to the re-detection mark signal to perform the re-detection.

That is, the re-detection and control unit 13 may determine whether the echo pulse is present within a special time range according to the sampled signal sampled by the ADC driving module 151. If the echo pulse is detected within the special time range, a re-detection mark signal is emitted to the timing control module 142. The timing control module 142 obtains an idle time period in the ranging window according to the re-detection mark signal, that is, before the laser device of the next detection channel may emit the sequence of laser pulses, the laser device of the current detection channel is controlled to emit the third detection pulse to perform the re-detection.

The lidar 10 provided in this embodiment has the shortest detection path and a control path compatible with the original sequential logic, and no control signal with a higher priority is needed to trigger the laser device to emit light.

Figure 12:
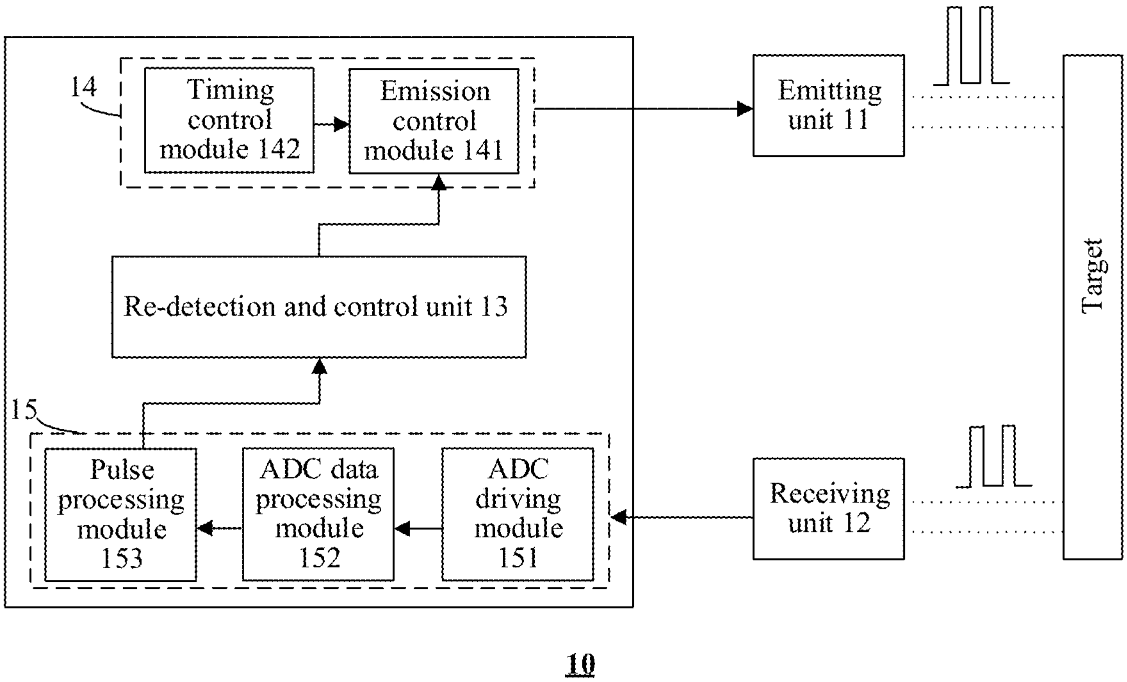
FIG. 12 schematically shows an example of a lidar according to some embodiment of the present disclosure.

According to some embodiment of the present disclosure, as shown in FIG. 12, in the lidar 10: the re-detection and control unit 13 may receive the ranging result outputted by the pulse processing module 153, and detects whether an echo pulse is present within a special time range according to the ranging result; and the re-detection and control unit 13 may emit a re-detection mark signal to the emission control module 141, and the emission control module 141 triggers the emitting unit 11 to emit the third detection pulse to perform re-detection according to the re-detection mark signal.

That is, the re-detection and control unit 13 may determine whether an echo pulse is present within a special time range according to the complete waveform of an echo pulse outputted by the pulse processing module 153. If the echo pulse is detected within the special time range, a re-detection mark signal is emitted to the emission control module 141. The emission control module 141 may immediately emit the third detection pulse to perform the re-detection according to the re-detection mark signal after the laser device of the current detection channel completes emitting the sequence of laser pulses.

The lidar 10 provided in this embodiment has a long detection path and a short control path, and therefore the control time is longer. However, information after passing through the pulse processing module includes information such as a pulse leading time, a pulse width, and a peak value, so that the detection can be completed more accurately without needing to calculate and detect the original ADC data, and false detection is not easy to occur.

Figure 13:
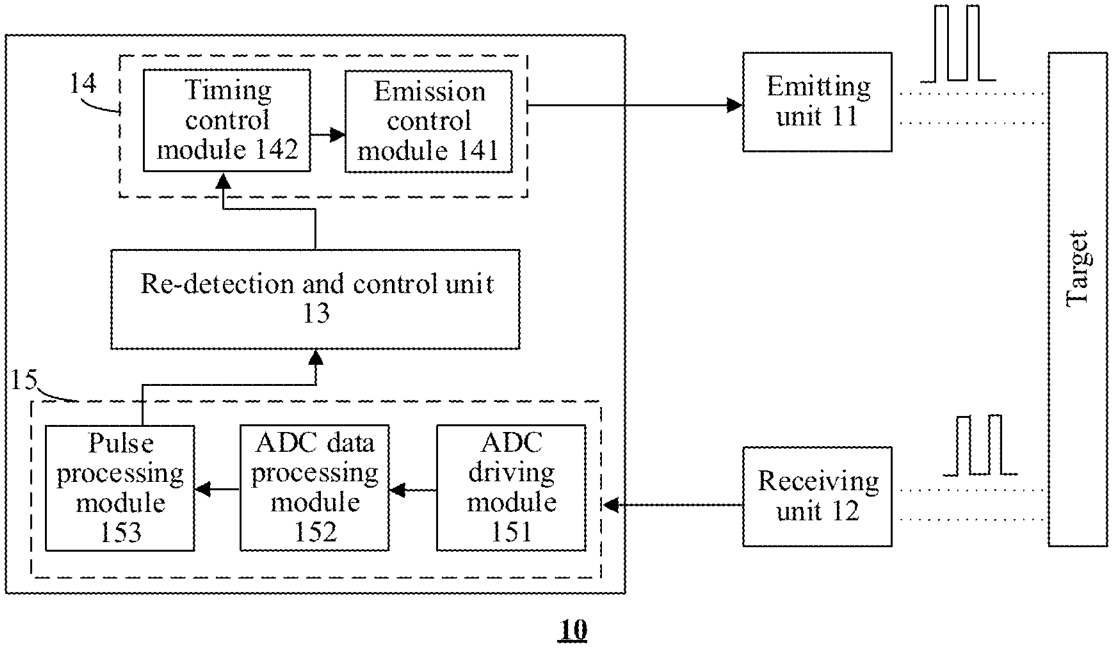
FIG. 13 schematically shows an example of a lidar according to some embodiment of the present disclosure.

According to some embodiment of the present disclosure, as shown in FIG. 13, in the lidar 10: the re-detection and control unit 13 may receive the ranging result outputted by the pulse processing module 153, and detects whether an echo pulse is present within a special time range according to the ranging result; and the re-detection and control unit 13 emits a re-detection mark signal to the timing control module 142, and the timing control module 142 obtains an idle time period from a ranging window according to the re-detection mark signal to perform the re-detection.

That is, the re-detection and control unit 13 may determine whether an echo pulse is present within a special time range according to the complete waveform of the echo pulse outputted by the pulse processing module 153. If the echo pulse is detected within the special time range, a re-detection mark signal is emitted to the timing control module 142. The timing control module 142 obtains an idle time period in the ranging window according to the re-detection mark signal, that is, before the laser device of the next detection channel emits the sequence of laser pulses, the laser device of the current detection channel is controlled to emit the third detection pulse to perform the re-detection.

The lidar 10 provided in this embodiment has the longest detection and control path, and has the best compatibility with the original architecture of the lidar without needing additional calculation and control, but has the longest path delay, and therefore is applicable to an application scene with enough ranging window time.

According to some embodiment of the present disclosure, the lidar 10 comprises: The pulse processing module 153 may determine according to the re-detection mark signal whether the re-detection is performed and which mode is used for re-detection. If the re-detection is performed in the mode of emitting a single pulse, the processing algorithm of the pulse processing module 153 is used for calculating the ranging result through single-pulse decoding.

According to an embodiment of the present disclosure, the second sequence of laser pulses may be a sequence of single pulse or a sequence of multiple pulses. The signal processing unit may perform signal processing through single-pulse decoding or multi-pulse decoding depending on whether the second sequence of laser pulses is the sequence of single pulse or the sequence of multiple pulses, and output a re-detection result.

A preferred embodiment of the present disclosure provides a method for controlling a lidar. According to the control method, re-detection is performed on a blind area caused by an overlay between an echo pulse and an echo signal of stray light produced by an optical window, thereby achieving a more accurate ranging result of the lidar and achieving full coverage of the field of view within a detection range of the lidar.

Finally, it should be noted that: the foregoing descriptions are merely preferred embodiments of the present disclosure, but are not intended to limit the present disclosure. Although the present disclosure has been described in detail with reference to the foregoing embodiments, a person skilled in the art may make modifications to the technical solutions described in the foregoing embodiments, or make equivalent replacements to some technical features in the technical solutions. Any modification, equivalent replacement, or improvement made and the like within the spirit and principle of the present disclosure shall fall within the protection scope of the present disclosure.

What is claimed is:

1. A method for controlling a lidar, the method comprising:

- emitting a first sequence of laser pulses, the first sequence of laser pulses comprising at least a first detection pulse and a second detection pulse coded at a time interval T;
- receiving a plurality of echo pulses;
- determining whether an overlay is present among the plurality of echo pulses; and
- controlling the lidar to emit a second sequence oflaser pulses to perform re-detection based on a determination of whether the overlay is present among the plurality of echo pulses, wherein the determining whether the overlay is present among the plurality of echo pulses comprises determining whether the overlay is present among the plurality of echo pulses based on an echo pulse of the plurality of echo pulses, wherein the echo pulse of the plurality of echo pulses is not overlaid with an echo pulse of an optical window, and wherein determining whether the overlay is present among the plurality of echo pulses comprises determining whether the echo pulse is present within a special time range, the special time range being: a time range from (2T−Δt) to (2T+Δt) after emission of the first detection pulse, Δt being determined according to a time interval between the first sequence of laser pulses and the echo pulse of the optical window corresponding to the first sequence of laser pulses.

2. The method according to claim 1, wherein determining whether the overlay is present among the plurality of echo pulses comprises determining whether the echo pulse is greater than a first threshold when the echo pulse is present within the special time range, and wherein controlling the lidar to emit the second sequence of laser pulses to perform the re-detection based on the determination of whether the overlay is present among the plurality of echo pulses comprises controlling the lidar to emit the second sequence of laser pulses to perform the re-detection when the echo pulse is greater than the first threshold.

3. A lidar, comprising:

an emitting unit, configured to emit a first sequence of laser pulses, the first sequence of laser pulses comprising at least a first detection pulse and a second detection pulse coded at a time interval T;

a receiving unit, configured to receive a plurality of echo pulses;

a re-detection and control unit, configured to determine whether an overlay is present among the plurality of echo pulses; and an emission control unit, configured to control the lidar to emit a second sequence of laser pulses to perform re-detection based on a determination of whether the overlay is present among the plurality of echo pulses, wherein the re-detection and control unit is further configured to determine whether the overlay is present among the plurality of echo pulses based on an echo pulse of the plurality of echo pulses, wherein the echo pulse of the plurality of echo pulses is not overlaid with an echo pulse of an optical window, and wherein the re-detection and control unit is configured to determine whether the overlay is present among the plurality of echo pulses based on a determination of whether an echo pulse is present within a special time range, the special time range being: a time range from (2T−Δt) to (2T+Δt) after emission of the first detection pulse, Δt being determined according to a time interval between the first sequence of laser pulses and the echo pulse of the optical window corresponding to the first sequence of laser pulses.

4. The lidar according to claim 3, wherein the re-detection and control unit is configured to determine whether the echo pulse is greater than a first threshold when the echo pulse is present within the special time range, and wherein the emission control unitis configured to control the lidar to emit the second sequence of laser pulses to perform the re-detection when the echo pulse is greater than the first threshold.

5. The lidar according to claim 3, further comprising a signal processing unit, the signal processing unit comprising:

an analog-to-digital converter (ADC) driving module, configured to sample the echo pulse and generate a sampled signal;

an ADC data processing module, configured to extract pulse information from the sampled signal to obtain basic pulse information; and a pulse processing module, configured to process the basic pulse information and output a ranging result.

6. The lidar according to claim 5, wherein the emission control unit comprises:

an emission control module, configured to emit a control signal to the emitting unit to trigger the emitting unit to emit a laser detection pulse; and a timing control module, configured to generate a timing control signal and emit the timing control signal to the emission control module.

7. The lidar accordingto claim 6, wherein the re-detection and control unit is further configured to receive the sampled signal generated by the ADC driving module, and determine whether the echo pulse is present within a special time range based on the sampled signal; and the re-detection and control unit is further configured to emit a re-detection signal to the emission control module, and the emission control module is further configured to trigger the emitting unit to emit the second sequence of laser pulses to perform re-detection based on the re-detection signal.

8. The lidar according to claim 6, wherein the re-detection and control unit is further configured to receive the sampled signal generated by the ADC driving module, and determine whether the echo pulse is present within a special time range based on the sampled signal; and the re-detection and control unit is further configured to emit a re-detection signal to the timing control module, and wherein the timing control module is further configured to obtain an idle time period from a ranging window to performre-detection based on the re-detection signal.

9. The lidar according to claim 6, wherein the re-detection and control unit is further configured to receive the ranging result outputted by the pulse processing module, and determine whether an echo pulse is present within a special time range based on the ranging result; and the re-detection and control unit is further configured to emit a re-detection signal to the emission control module, and wherein the emission control module is further configured to trigger the emitting unit to emit the second sequence of laser pulses to perform re-detection based on the re-detection signal.

10. The lidar according to claim 6, wherein the re-detection and control unit is further configured to receive the ranging result outputted by the pulse processing module, and determine whether an echo pulse is present within a special time range based on the ranging result; and the re-detection and control unit is further configured to emit a re-detection signal to the timing control module, and wherein the timing control module is further configured to ob tain an idle time period from a ranging window to performre-detection based on the re-detection signal.

11. The lidar according to claim 6, wherein the emission control unitis further configured to: control the lidar to emit the second sequence oflaser pulses to perform re-detection when the overlay is present among the plurality of echo pulses, the second sequence of laser pulses being a sequence of single pulses or a sequence of multiple pulses.

12. The lidar according to claim 11, wherein the signal processing unit is configured to perform signal processing through single-pulse decoding or multi-pulse decoding depending on whether the second sequence of laser pulses is the sequence of single pulses or the sequence of multiple pulses, and outputting a re-detection result.

13. A method for controlling a lidar, the method comprising:

emitting a first sequence of laser pulses, the first sequence of laser pulses comprising at least a first detection pulse and a second detection pulse coded at a time interval T;

receiving a plurality of echo pulses;

determining whether an overlay is present among the plurality of echo pulses; and controlling the lidar to emita second sequence oflaser pulses to perform re-detection based on a determination of whether the overlay is present among the plurality of echo pulses, wherein the determining whether the overlay is present among the plurality of echo pulses comprises determining whether the overlay is present among the plurality of echo pulses based on an overlay between an echo pulse of an optical window and an echo pulse, and wherein determining whether the overlay is present among the plurality of echo pulses comprises determining whether an echo pulse is present within a special time range, the special time range being: a time range from (T−Δt) to (T+Δt) after emission of the first detection pulse, Δt being determined according to a time interval between the first sequence of laser pulses and the echo pulse of the optical window corresponding to the first sequence of laser pulses.

14. The method according to claim 13, wherein determining whether the overlay is present amongthe plurality of echo pulses comprises determining whether the echo pulse within the special time range is greater than a first threshold when the echo pulse is present within the special time range, and wherein controlling the lidar to emit the second sequence of laser pulses to perform the re-detection based on the determination of whether the overlay is present among the plurality of echo pulses comprises controlling the lidar to emit the second sequence of laser pulses to perform the re-detection when the echo pulse is greater than a second threshold.

15. The method according to claim 14, wherein the second threshold is obtained according to an average of optical window echo intensities of the lidar through a plurality of measurements and a first threshold of the echo pulse.

16. The method according to claim 13, wherein controlling the lidar to emit the second sequence of laser pulses to perform the re-detection based on the determination of whether the overlay is present among the plurality of echo pulses comprises controlling the lidar to emit the second sequence of laser pulses to perform re-detection when the overlay is present among the plurality of echo pulses, the second sequence of laser pulses comprising a third detection pulse.

17. The method according to claim 13, wherein controlling the lidar to emit the second sequence of laser pulses to perform the re-detection based on the determination of whether the overlay is present among the plurality of echo pulses comprises controlling the lidar to emit the second sequence of laser pulses to perform re-detection when the overlay is present among the plurality of echo pulses, the second sequence of laser pulses comprising at least a fourth detection pulse and a fifth detection pulse coded at a time interval T', and wherein the time interval T' being different from the time interval T.

18. The method according to claim 13, further comprising setting a re-detection mark signal to adjust a priority of emitting the second sequence of laser pulses when the echo pulse is detected within the special time range.

19. The method according to claim 18, further comprising:

immediately emitting the second sequence of laser pulses to perform the re-detection accordingto the re-detection mark signal in responseto a laser device in a current detection channel that completes emitting the first sequence of laser pulses.

20. The method according to claim 19, further comprising emitting, by the laser device in the current detection channel, the second sequence of laser pulses to perform the re-detection accordingto the re-detection mark signal beforea laser device in a next detection channel emits the first sequence of laser pulses.

21. The method according to claim 13, further comprising sampling the echo pulse and acquiring a waveform of the echo pulse.

22. The method accordingto claim 21, further comprising detecting whether the echo pulse is present within the special time range according to the sampled signal of the echo pulse.

23. The method accordingto claim 21, further comprising detecting whether the echo pulse is present within the special time range according to the waveform of the echo pulse.

24. The method according to claim 19, further comprising:

completing the re-detection between completion of current detection of the current detection channel in response to emitting the first sequence of laser pulses and start of detection of a next detection channel; and resetting the re-detection mark signal for each detection channel before start of detection of a next detection channel.

25. The method according to claim 13, further comprising acquiring a re-detection result.

26. The method according to claim 25, further comprising:

performing signal processing through single-pulse decoding or multi-pulse decoding depending on whether the second sequence of laser pulses is a sequence of single pulses or a sequence of multiple pulses; and outputting the re-detection result.

27. The method according to claim 13, wherein the lidar is a coaxial lidar.

28. A lidar, comprising:

an emitting unit, configured to emit a first sequence of laser pulses, the first sequence of laser pulses comprising at least a first detection pulse and a second detection pulse coded at a time interval T;

a receiving unit, configured to receive a plurality of echo pulses;

a re-detection and control unit, configured to determine whether an overlay is present among the plurality of echo pulses; and an emission control unit, configured to control the lidar to emit a second sequence of laser pulses to perform re-detection based on a determination of whether the overlay is present among the plurality of echo pulses, wherein the re-detection and control unit is further configured to determine whether the overlay is present among the plurality of echopulses based on the overlay between an echo pulse of an optical window and an echo pulse, and wherein the re-detection and control unit is configured to determine whether the overlay is present among the plurality of echo pulses based on the determination of whether an echo pulse is present within a special time range, the special time range being: a time range from (T−Δt) to (T+Δt) after emission of the first detection pulse, Δt being determined according to a time interval between the first sequence of laser pulses and the echo pulse of the optical window corresponding to the first sequence of laser pulses.

29. The lidar according to claim 28, wherein the re-detection and control unit is configured to determine whether the echo pulse within the special time range is greater than a second threshold when the echo pulse is present within a special time range, and wherein the emission control unit is configured to control the lidar to emit the second sequence of laser pulses to perform re-detection when the echo pulse is greater than the second threshold.

30. The lidar according to claim 29, wherein the second threshold is obtained based on an average of optical window echo intensities of the lidar through a plurality of measurements and a first threshold of the echo pulse.

31. The lidar according to claim 28, further comprising a signal processing unit, the signal processing unit comprising:

an analog-to-digital converter (ADC) driving module, configured to sample the echo pulse and generate a sampled signal;

an ADC data processing module, configured to extract pulse information from the sampled signal to obtain basic pulse information; and a pulse processing module, configured to process the basic pulse information and output a ranging result.

32. The lidar according to claim 31, wherein the emission control unit comprises:

an emission control module, configured to emit a control signal to the emitting unit to trigger the emitting unit to emit a laser detection pulse; and a timing control module, configured to generate a timing control signal and emit the timing control signal to the emission control module.

33. The lidar according to claim 32, wherein the re-detection and control unit is further configured to receive the sampled signal generated by the ADC driving module, and determine whether the echo pulse is present within a special time range based on the sampled signal; and the re-detection and control unit is further configured to emit a re-detection signal to the emission control module, and the emission control module is further configured to trigger the emitting unit to emit the second sequence of laser pulses to perform re-detection based on the re-detection signal.

34. The lidar according to claim 32, wherein the re-detection and control unit is further configured to receive the sampled signal generated by the ADC driving module, and determine whether the echo pulse is present within a special time range based on the sampled signal; and the re-detection and control unit is further configured to emit a re-detection signal to the timing control module, and wherein the timing control module is further configured to ob tain an idle time period from a ranging window to performre-detection based on the re-detection signal.

35. The lidar according to claim 32, wherein the re-detection and control unit is further configured to receive the ranging result outputted by the pulse processing module, and determine whether an echo pulse is present within a special time range based on the ranging result; and the re-detection and control unit is further configured to emit a re-detection signal to the emission control module, and wherein the emission control module is further configured to trigger the emitting unit to emit the second sequence of laser pulses to perform re-detection based on the re-detection signal.

36. The lidar according to claim 32, wherein the re-detection and control unit is further configured to receive the ranging result outputted by the pulse processing module, and determine whether an echo pulse is present within a special time range based on the ranging result; and the re-detection and control unit is further configured to emit a re-detection signal to the timing control module, and wherein the timing control module is further configured to ob tain an idle time period from a ranging window to performre-detection based on the re-detection signal.

* * * * *